US008583786B2

(12) United States Patent
Swamidas et al.

(10) Patent No.: US 8,583,786 B2
(45) Date of Patent: Nov. 12, 2013

(54) SYSTEMS AND METHODS FOR RATING A CONTENT BASED ON TRENDS

(75) Inventors: Peter Jayaprathap Swamidas, Irving, TX (US); Ai-Sheng Mao, Richardson, TX (US); Vamshi Gillipalli, Irving, TX (US); John P. Valdez, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 226 days.

(21) Appl. No.: 13/011,102

(22) Filed: Jan. 21, 2011

(65) Prior Publication Data

US 2012/0191841 A1    Jul. 26, 2012

(51) Int. Cl.
*G06F 15/173* (2006.01)
(52) U.S. Cl.
USPC .......................................................... 709/224
(58) Field of Classification Search
USPC .............. 707/E17.009, 748; 709/224; 725/34
See application file for complete search history.

(56) References Cited

U.S. PATENT DOCUMENTS

| 7,890,513 B2* | 2/2011 | Plastina et al. ................. 707/748 |
| 2008/0155588 A1* | 6/2008 | Roberts et al. .................... 725/34 |
| 2009/0119258 A1* | 5/2009 | Petty ................................. 707/3 |

* cited by examiner

Primary Examiner — Kyung H Shin

(57) ABSTRACT

A system for and method of rating a content is presented. The method may include receiving first user data associated with one or more contents for a first predetermined time period and second user data associated with the one or more contents for a second predetermined time period. The method may also include determining a first average of the first user data associated with the one or more contents for the first predetermined time period and a second average of the second user data associated with the one or more contents for the second predetermined time period. The method may further include determining a variance between the first average of the first user data associated with the one or more contents for the first predetermined time period and the second average of the second user data associated with the one or more contents for the second predetermined time period. The method may additionally include determining trend value of the one or more contents based at least in part on the variance between the first average of the first user data associated with the one or more contents for the first predetermined time period and the second average of the second user data associated with the one or more contents for the second predetermined time period.

21 Claims, 7 Drawing Sheets

400

| Days | CPHC | UBT | Trend Weight | CPWD |
|---|---|---|---|---|
| 20 | 4500 | 3 | 0.000666667 | 0.002 |
| 19 | 3900 | 4 | 0.001025641 | 0.004103 |
| 18 | 3800 | 4 | 0.001052632 | 0.004211 |
| 17 | 3650 | 4 | 0.00109589 | 0.004384 |
| 16 | 3324 | 6 | 0.001805054 | 0.01083 |
| 15 | 2024 | 5 | 0.002470356 | 0.012352 |
| 14 | 1827 | 4 | 0.002189381 | 0.008758 |
| 13 | 1690 | 4 | 0.002366864 | 0.009467 |
| 12 | 1421 | 5 | 0.003518649 | 0.017593 |
| 11 | 1318 | 6 | 0.004552352 | 0.027314 |
| 10 | 1310 | 8 | 0.00610687 | 0.048855 |
| 9 | 1212 | 7 | 0.005775578 | 0.040429 |
| 8 | 1165 | 30 | 0.025751073 | 0.772532 |
| 7 | 1025 | 20 | 0.019512195 | 0.390244 |
| 6 | 876 | 20 | 0.02283105 | 0.456621 |
| 5 | 721 | 24 | 0.033287101 | 0.79889 |
| 4 | 689 | 30 | 0.043541364 | 1.306241 |
| 3 | 543 | 25 | 0.046040516 | 1.151013 |
| 2 | 332 | 20 | 0.060240964 | 1.204819 |
| 1 | 234 | 50 | 0.213675214 | 10.68376 |

| Days | CPHC | UBT | Trend Weight | CPWD |
|------|------|-----|--------------|------|
| 20 | 4500 | 7 | 0.001555556 | 0.010888889 |
| 19 | 4000 | 8 | 0.002 | 0.016 |
| 18 | 3800 | 6 | 0.001578947 | 0.009473684 |
| 17 | 3600 | 5 | 0.001388889 | 0.006944444 |
| 16 | 3300 | 50 | 0.015151515 | 0.757575758 |
| 15 | 2000 | 20 | 0.01 | 0.2 |
| 14 | 1800 | 25 | 0.013888889 | 0.347222222 |
| 13 | 1600 | 30 | 0.01875 | 0.5625 |
| 12 | 1400 | 24 | 0.017142857 | 0.411428571 |
| 11 | 1300 | 20 | 0.015384615 | 0.307692308 |
| 10 | 1300 | 20 | 0.015384615 | 0.307692308 |
| 9 | 1200 | 30 | 0.025 | 0.75 |
| 8 | 1100 | 4 | 0.003636364 | 0.014545455 |
| 7 | 1000 | 4 | 0.004 | 0.016 |
| 6 | 800 | 5 | 0.00625 | 0.03125 |
| 5 | 700 | 6 | 0.008571429 | 0.051428571 |
| 4 | 600 | 4 | 0.006666667 | 0.026666667 |
| 3 | 500 | 4 | 0.008 | 0.0320 |
| 2 | 300 | 4 | 0.013333333 | 0.053333333 |
| 1 | 200 | 3 | 0.015 | 0.045 |

| Days | CPHC | UBT | Trend Weight | CPWD |
|---|---|---|---|---|
| 20 | 422345428 | 20 | 0.0000000474 | 9.47092E-07 |
| 19 | 123345764 | 60 | 0.0000004864 | 2.91862E-05 |
| 18 | 675675677 | 50 | 0.0000000740 | 3.7E-06 |
| 17 | 5237345 | 80 | 0.0000152749 | 0.001221993 |
| 16 | 45456456 | 52 | 0.0000011440 | 5.94855E-05 |
| 15 | 20344566 | 50 | 0.0000024577 | 0.000122883 |
| 14 | 34566 | 48 | 0.0013886478 | 0.066655095 |
| 13 | 567890 | 40 | 0.0000704362 | 0.002817447 |
| 12 | 1444544 | 38 | 0.0000263059 | 0.000999623 |
| 11 | 130004 | 45 | 0.0003461432 | 0.015576444 |
| 10 | 431547 | 30 | 0.0000695173 | 0.00208552 |
| 9 | 785433 | 9 | 0.0000114586 | 0.000103128 |
| 8 | 4563455 | 8 | 0.0000017531 | 1.40245E-05 |
| 7 | 56777 | 7 | 0.0001232894 | 0.000863026 |
| 6 | 6788 | 6 | 0.0008839128 | 0.005303477 |
| 5 | 9865 | 5 | 0.0005068424 | 0.002534212 |
| 4 | 788 | 4 | 0.0050761421 | 0.020304569 |
| 3 | 99 | 3 | 0.0303030303 | 0.090909091 |
| 2 | 456 | 2 | 0.0043859649 | 0.00877193 |
| 1 | 788 | 3 | 0.0038071066 | 0.01142132 |

| Days | CPHC | UBT | Trend Weights | CPWD |
|---|---|---|---|---|
| 20 | 4500 | 79 | 0.017555556 | 1.386888889 |
| 19 | 4000 | 76 | 0.019 | 1.444 |
| 18 | 3800 | 70 | 0.018421053 | 1.289473684 |
| 17 | 3600 | 63 | 0.0175 | 1.1025 |
| 16 | 3300 | 66 | 0.02 | 1.32 |
| 15 | 2000 | 62 | 0.031 | 1.922 |
| 14 | 1800 | 60 | 0.033333333 | 2 |
| 13 | 1600 | 54 | 0.03375 | 1.8225 |
| 12 | 1400 | 57 | 0.040714286 | 2.320714286 |
| 11 | 1300 | 51 | 0.039230769 | 2.000769231 |
| 10 | 1300 | 48 | 0.036923077 | 1.772307692 |
| 9 | 1200 | 42 | 0.035 | 1.47 |
| 8 | 1100 | 40 | 0.036363636 | 1.454545455 |
| 7 | 1000 | 32 | 0.032 | 1.024 |
| 6 | 800 | 28 | 0.035 | 0.98 |
| 5 | 700 | 21 | 0.03 | 0.63 |
| 4 | 600 | 20 | 0.033333333 | 0.666666667 |
| 3 | 500 | 15 | 0.03 | 0.45 |
| 2 | 300 | 20 | 0.066666667 | 1.333333333 |
| 1 | 200 | 10 | 0.05 | 0.5 |

Figure 7

SYSTEMS AND METHODS FOR RATING A CONTENT BASED ON TRENDS

BACKGROUND INFORMATION

In the highly competitive content provider industry, content providers have much interest in identifying which contents users are interested in and trends of users' interest in content. Conventionally, ratings groups have users complete detailed surveys to gather information about what content the users are interested in. The ratings groups then calculate a rating for each of the contents based on the number of users is interested in a particular content. Also, rating groups monitor a number of times a keyword has been mentioned in contents in order to identify a trend in the contents. Ratings surveys and monitoring services, however, may not accurately reflect what contents users are interested in over time at least due to a limited sample size, limited time period, limited parameters in consideration, and errors in users completing the surveys.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 4 is a table of user data for rating a content based at least in part on a trend value of the content according to a particular embodiment;

FIG. 5 is another table of user data for rating a content based at least in part on a trend value of the content according to a particular embodiment;

FIG. 6 is another table of user data for rating a content based at least in part on a trend value of the content according to a particular embodiment; and FIG. 7 is another table of user data for rating a content based at least in part on a trend value of the content according to a particular embodiment.

DETAILED DESCRIPTION OF PREFERRED EMBODIMENTS

Figure 1:
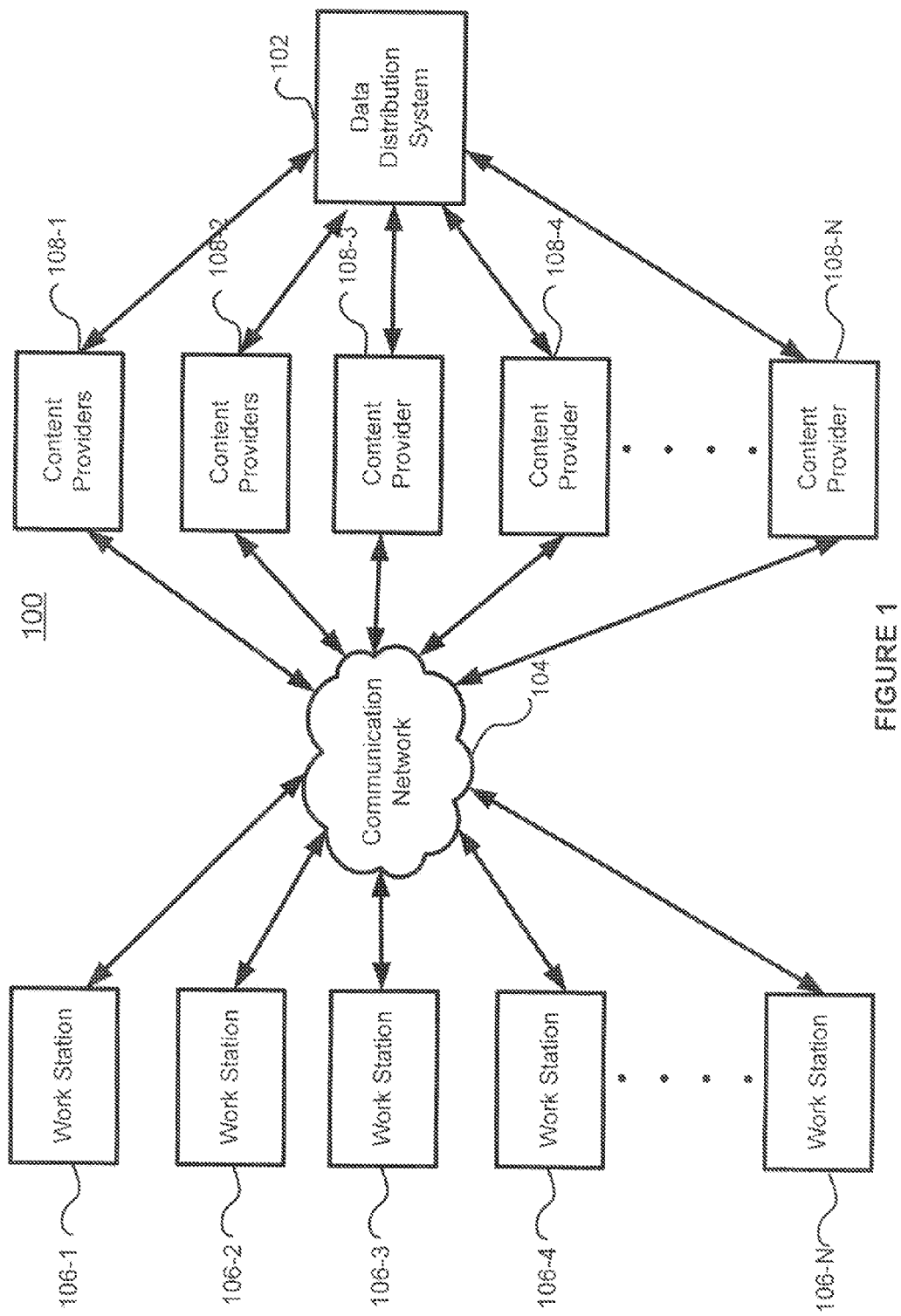
FIG. 1 is a schematic diagram illustrating a trend based rating system according to particular embodiments.

An exemplary embodiment provides a system and a method for rating a content based at least in part on a trend of the content. For example, a trend based rating system may receive user data associated with a content for various predetermined time periods from a plurality of work stations. The trend based rating system may receive user data associated with a content during a first predetermined time period. The trend based rating system may also receive user data associated with a content during a second predetermined time period. For example, the user data may include a number of times a content may be viewed by a user or an amount of time a content may be viewed by a user during a predetermined period of time.

The trend based rating system may determine an average (e.g., a simple moving average) of a number of times a content may be viewed by users during a first predetermined time period. Also, the trend based rating system may determine an average (e.g., a simple moving average) of a number of times a content may be viewed by users during a second predetermined time period. The trend based rating system may determine a variance between the average of the number of times a content may be viewed by user during the first predetermine time period and the average of the number of times a content may be viewed by user during the second predetermine time period.

The trend based rating system may determine an average (e.g., a simple moving average) of a weight of a content during a first predetermined time period. The weight of a content may be defined as an amount of time a content is viewed by the user per visit multiply by a trend weight. The trend weight may be calculated by an amount of time a user may view the content per visit divided by a number of times a content may be visited by users per day. The trend based rating system may determine the average (e.g., simple moving average) of a weight of a content during a second predetermined time period. The trend based rating system may determine a variance between the average of a weight of a content during the first predetermined time period and the average of a weight of a content during the second predetermined time period.

The trend rating system may determine a trend value of a content by multiplying the variance between the average of the number of times a content may be viewed by user during the first predetermine time period and the average of the number of times a content may be viewed by user during the second predetermine time period with the variance between the average of a weight of a content during the first predetermined time period and the average of a weight of a content during the second predetermined time period. For example, if the trend value of a content is low, the trend rating system may determine that the content may not be trending (e.g., neutral trending) and may assign a lower rating. If the trend value of a content is high, the trend rating system may determine that the content may not be trending and may assign a lower rating.

FIG. 1 is a schematic diagram illustrating a trend based rating system according to particular embodiments. As illustrated in FIG. 1, the trend based rating system 100 may include a trend rating system 102 coupled to a plurality of content providers 108(1-N). The content providers 108(1-N) may be provide various contents to a plurality of work stations 106(1-N) via a communication network 104. For example, the trend rating system 102 may determine a trend of a content for a predetermined period of time in order to rate user interest in a content. In an exemplary embodiment, the trend rating system 102 may receive user data from the plurality of work stations 106(1-N) or the plurality of content providers 108(1-N). The user data may include a number of times a user views a content in a predetermined time period. The user data may also include a user viewing time of the content in a predetermined time period. The trend rating system 102 may store the user data-received from the plurality of work stations 106(1-N) or the plurality of content providers 108(1-N).

The trend rating system 102 may calculate the trend of a content in a predetermined time period based at least in part on the received user data. In an exemplary embodiment, the trend rating system 102 may calculate an average (e.g., a simple moving average) of a number of times a content may be viewed by users during a predetermined time period. In another exemplary embodiment, the trend rating system 102 may calculate an average weight (e.g., a simple moving average) of a content by multiplying a number of times a content may be viewed by the user by a trending weight of a content. The trending weight of a content may be calculated by dividing the viewing time of the content by the user by a number of times a content may be viewed by the user during the predetermined time period. The trend rating system 102 may determine a trending value for a content based at least in part on the average of a number of times a content may be viewed by a user and the average weight of a content during a predetermined time period.

Content as used herein may refer to multimedia that uses, for example, one or more of text, audio, graphics, and video. For example, content may include a television program having commercial advertisements inserted therein or on-demand programming. The content may also include audio, video, music, interactive content, time-shifted content, photos, websites, banners, a webpage, recipes, instructions, advertisements, long advertisements (e.g. longer than the traditional 30 second spots used in television programs), text, interactive advertisements. Video on Demand (VoD) content, Video on Demand (VoD) advertising, user generated content, broadband content, advanced advertisements, additional content that the viewer selects to view, and/or combinations thereof.

The trend rating system 102 may include one or more servers. For example, the trend rating system 102 may include a UNIX based server, Windows 2000 Server, Microsoft IIS server, Apache HTTP server, API server, Java sever, Java Servlet API server, ASP server, PHP server, HTTP server, Mac OS X server, Oracle server, IP server, or other independent server to receive and monitor user data from a plurality of work stations 106(1-N). Also, the trend rating system 102 may include one or more Internet Protocol (IP) network server or public switch telephone network (PSTN) server. The trend rating system 102 may receive user data from the plurality of work stations 106(1-N) via the communication network 104.

The trend rating system 102 may include one or more storage devices including, without limitation, paper card storage, punched card, tape storage, paper tape, magnetic tape, disk storage, gramophone record, floppy disk, hard disk, ZIP disk, holographic, molecular memory. The one or more computer-readable media, such as one or more storage devices may also include, without limitation, optical disc, CD-ROM, CD-R, CD-RW, DVD, DVD-R, DVD-RW, DVD+R, DVD+RW, DVD-RAM, Blu-ray, Minidisc, HVD and Phase-change Dual storage device. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

The communication network 104 may be coupled to the trend rating system 102 and the plurality of work stations 106(1-N). The communication network 104 may be a wireless network, a wired network or any combination of wireless network and wired network. For example, the communication network 104 may include one or more of a fiber optics network, a passive optical network, a cable network, an Internet network, a satellite network (e.g., operating in Band C, Band Ku or Band Ka), a wireless LAN, a Global System for Mobile Communication (GSM), a Personal Communication Service (PCS), a Personal Area Network (PAN), D-AMPS. Wi-Fi, Fixed Wireless Data, IEEE 802.11a, 802.11b, 802.15.1, 802.11n and 802.11g or any other wired or wireless network for transmitting and receiving a data signal. In addition, the communication network 104 may include, without limitation, telephone line, fiber optics, IEEE Ethernet 802.3, wide area network (WAN), local area network (LAN), or global network such as the Internet. The communication network 104 may support an Internet network, a wireless communication network, a cellular network, or the like, or any combination thereof.

The communication network 104 may further include one, or any number of the exemplary types of networks mentioned above operating as a stand-alone network or in cooperation with each other. Although the communication network 104 is depicted as one network, it should be appreciated that according to one or more embodiments, the communication network 104 may comprise a plurality of interconnected networks, such as, for example, a service provider network, the Internet, a broadcaster's network, a cable television network, corporate networks, and home networks.

The plurality of work stations 106(1-N) may be a computer, a personal computer, a laptop, a cellular communication device, a workstation, a mobile device, a phone, a handheld PC, a personal digital assistant (PDA), a thin system, a fat system, a network appliance, an Internet browser, or other any other device that may be in communication with the plurality of content providers 108(1-N) via the communication network 104.

The content providers 108(1-N) may include one or more servers to provide contents to the plurality of workstations 106(1-N) via the communication network 104. For example, the content provider 108 may include a UNIX based server, Windows 2000 Server. Microsoft. IIS server, Apache HTTP server, API server, Java sever, Java Servlet API server, ASP server, PHP server, HTTP server, Mac OS X server, Oracle server, IP server, or other independent server to provide one or more contents to the plurality of work stations 106(1-N). Also, the plurality of content providers 108(1-N) may include one or more Internet Protocol (IP) network server or public switch telephone network (PSTN) server.

The plurality of content providers 108(1-N) may include one or more storage devices including, without limitation, paper card storage, punched card, tape storage, paper tape, magnetic tape, disk storage, gramophone record, floppy disk, hard disk, ZIP disk, holographic, molecular memory. The one or more storage devices may also include, without limitation, optical disc, CD-ROM, CD-R, CD-RW. DVD, DVD-R, DVD-RW, DVD+R, DVD+RW, DVD-RAM, Blu-ray, Minidisc, HVD and Phase-change Dual storage device. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

Figure 2:
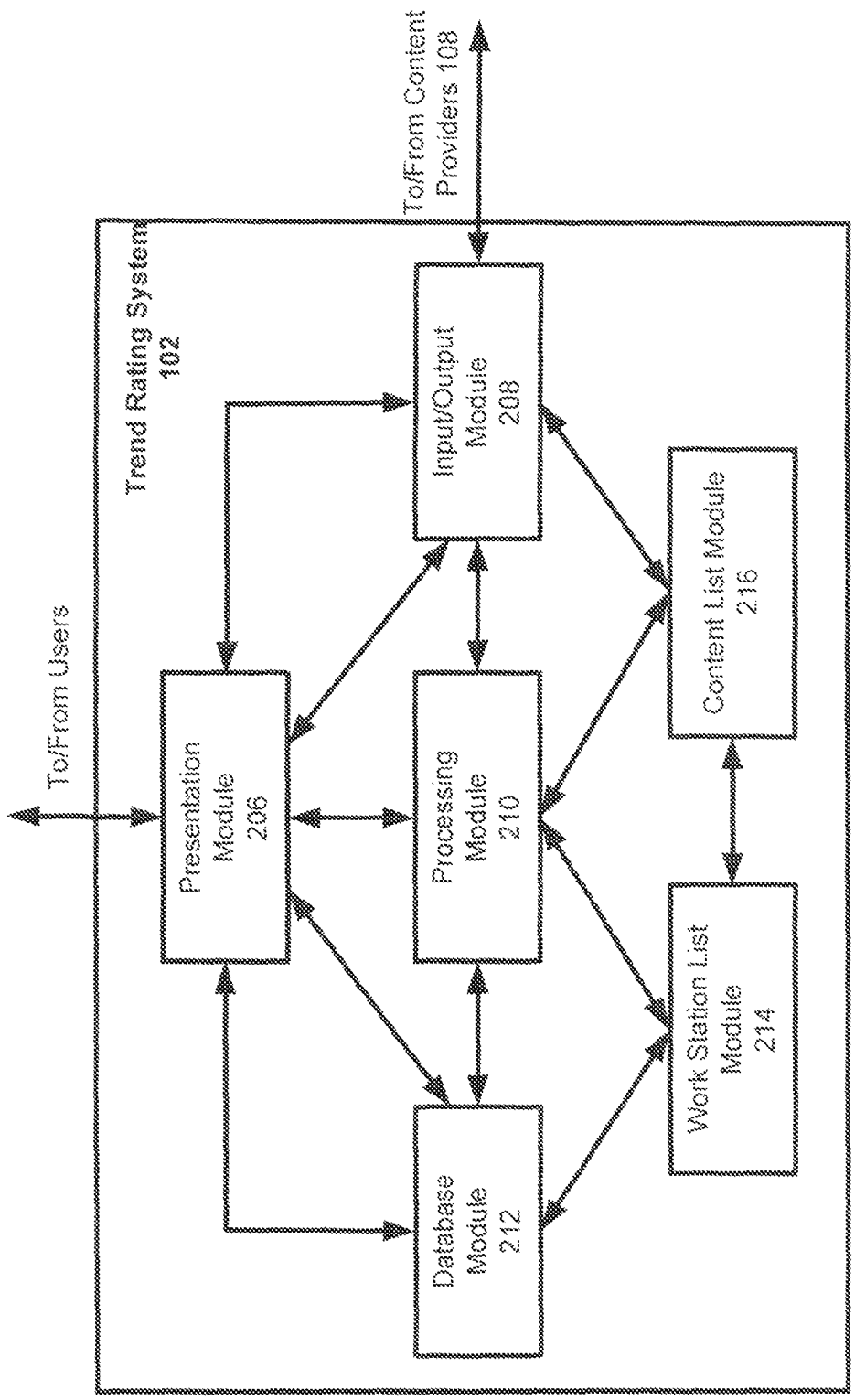
FIG. 2 is a block diagram of a hardware component of the trend rating system 102 of a particular embodiment.

FIG. 2 is a block diagram of a hardware component of the trend rating system 102 of a particular embodiment. The trend rating system 102 may include a presentation module 206, an input/output (I/O) module 208, a processing module 210, a database module 212, a work station list module 214, or a content list module 216. It is noted that the modules 206, 208, 210, 212, 214, and 216 are exemplary and the functions performed by one or more of the modules may be combined with that performed by other modules. The functions described herein as being performed by the modules 206, 208, 210, 212, 214, and 216 also may be separated and may be located or performed by other modules. Moreover, the modules 206, 208, 210, 212, 214, and 216 may be implemented at other devices of the trend based rating system 100 (e.g., the communication network 104, the plurality of work stations 106(1-N), the plurality of content providers 108(1-N)).

The input/output (I/O) module 208 may include routers, repeater, antennas, or other transceiver device for transmitting data to and receiving data from the plurality of work stations 106(1-N) or the plurality of content providers 108(1-N). For example, the input/output (I/O) module 208 may receive user data from the plurality of content providers 108. The input/output (I/O) module 208 may establish a communication link with the plurality of content providers 108 and receive user data from the plurality of content providers. In another exemplary embodiment, the input/output (I/O) module 208 may receive user data directly from the plurality of work stations 106(1-N). The input/output (I/O) module 208 may establish a communication link with the plurality of work stations 106(1-N) and receive user data from the plurality of work stations 106(1-N). The user data may include information associated with a content viewed by a user associated with a work station 106. For example, the information associated with the content may include address information associated with the content (e.g., uniform resource identifiers (URI), uniform resource locators (URL)) or other identification information to the content. The user data may also include a number of times a user may view a content, an amount of time the user spent viewing a content and other user viewing histories associated with a content.

The input/output (I/O) module 208 may preprocess the user data received from the plurality of work stations 106(1-N) or the plurality of content providers 108(1-N) (e.g., filter, sort, format, and aggregate). In an exemplary embodiment, the preprocessing of the user data received by the input/output (I/O) module 208 may include filtering the user data and eliminating erroneous or defective user data, sorting the user data, formatting the user data into desired format (e.g., identify various portions of the user data), and aggregating the user data from the plurality of work stations 106(1-N) or the plurality of content providers 108(1-N).

The user data may be transferred from the input/output (I/O) module 208 to the processing module 210 for processing. The processing module 210 may process the user data to perform various calculations in order to determine a trend value of a content. The processing module 210 may include a processor or a plurality of sub-analytical modules having a processor to perform various calculations in order to determine a trend value of a content based on user data. For example, the processing module 210 may identify user data associated with a content and user data associated with various predetermined time periods. The processing module 210 may determine an average (e.g., a simple moving average) of a number of times a content may be viewed by users during a first predetermined time period. The predetermined time period may be based at least in part on various parameters. In an exemplary embodiment, the predetermined time period may be based at least in part on a weekend, a week, a month, a year, a holiday, a festival, or other user defined time periods. The processing module 210 may determine an average (e.g., a simple moving average) of a number of time the content may be viewed by users during a second predetermined time period. For example, the first predetermined time period may be different from the second predetermined time period. In an exemplary embodiment, the first predetermined time period may be 50 days and the second predetermined time period may be 200 days.

The processing module 210 may determined a variance between the average of a number of times a content may be viewed by users during the first predetermined time period and the average of a number of times the content may be viewed by users during the second predetermined time period. In an exemplary embodiment, the processing module 210 may apply an Euclidean algorithm to determine a variance the average of a number of times a content may be viewed by users during the first predetermined time period and the average of a number of times the content may be viewed by users during the second predetermined time period. In an exemplary embodiment, if the variance between the simple moving average of a number of times a content may be viewed by users during the first predetermined time period and the simple moving average of a number of times the content may be viewed by users during the second predetermined time period is small, then the processing module 210 may determine that the content is trending and may provide a higher trend value. In another exemplary embodiment, if the variance between the simple moving average of a number of times a content may be viewed by users during the first predetermined time period and the simple moving average of a number of times the content may be viewed by users during the second predetermined time period is large, then the processing module 210 may determine that the content is not trending and may provide a lower trend value.

The processing module 210 may determine an average (e.g., a simple moving average) of a weight of a content during a first predetermined time period. The weight of a content may be defined by multiplying an amount of time a content is viewed by the user per visit during a predetermined time period by the trend weight of a content during the predetermined time period. The trend weight of a content may be calculated by dividing the viewing time of the content by the user during the predetermined time period by a number of times a content may be viewed by a user during a predetermined time period. The processing module 210 may determined an average (e.g., a simple moving average) of a weight of a content during a second predetermined time period. For example, the first predetermined time period and the second predetermined time period may be different. In an exemplary embodiment, the first predetermined time period may be 50 days and the second predetermined time period may be 200 days.

The processing module 210 may determined a variance between the average of a weight of a content during the first predetermined time period and the average of a weight of the content during the second predetermined time period. In an exemplary embodiment, the processing module 210 may apply an Euclidean algorithm to determine a variance between the average of a weight of a content during the first predetermined time period and the average of a weight of the content during the second predetermined time period. In an exemplary embodiment, if the variance between the average of a weight of a content during the first predetermined time period and the average of a weight of the content during the second predetermined time period is small, then the processing module 210 may determine that the content is trending and may provide a higher trend value. In another exemplary embodiment, if the variance between the simple moving average of the weight of a content during the first predetermined time period and the simple moving average of the weight of the content during the second predetermined time period is large, then the processing module 210 may determine that the content is not trending and may provide a lower trend value.

The processing module 210 may determine a trend value of a content. For example, the processing module 210 may determine the trend value of a content by multiplying the variance between the average of a number of times a content may be viewed by users during the first predetermined time period and the average of a number of times a content may be viewed by users during the second predetermined time period with the variance between the average of a weight of a content during the first predetermined time period and the average of a weight of a content during the second predetermined time period. In an exemplary embodiment, if the trend value of a content is small, then the processing module 210 may determine that the content is trending. In another exemplary embodiment, if the trend value of a content is large, then the processing module 210 may determine that the content is not trending.

In another exemplary embodiment, the processing module 210 may access the database module 212 to identify user data associated with a plurality of contents during various predetermined time periods. In an exemplary embodiment, the processing module 210 may identify the user data provided by the plurality of work stations 106(1-N) or the plurality of content providers 108(1-N). The processing module 210 may access the database module 212 to identify the user data based at least in part on the content. For example, the processing module 210 may search the database module 212 to identify the user data based at least in part on the address information (e.g., URL or URI) associated with the content. The processing module 210 may access the database module 212 at predetermined periodic intervals. The predetermined periodic intervals may be a second, a minute, an hour, a day, a week, a month, a year, or a user defined predetermined time periods. For example, the processing module 210 may periodically access the database module 210 to obtain user data stored in the database module 212. In an exemplary embodiment, the processing module 210 may access the database module 212 at the end of a first predetermined time period to obtain user data stored in the database module 212 associated with the first predetermined time period. In another exemplary embodiment, the processing module 210 may access the database module 212 at the end of a second predetermined time period to obtain user data stored in the database module 212 associated with the second predetermined time period.

In an exemplary embodiment, the processing module 210 may periodically update the trend value of a content based at least in part on a trending of the content. The processing module 210 may update the trend value of a content every minute, hour, day, week, month, a year, or other user predetermined time periods. In another exemplary embodiment, the processing module 210 may update the trend value of content based at least in part on received user data. For example, the processing module 210 may receive updated user data from a plurality of work stations 106(1-N) and a plurality of content providers (1-N) and may update a trend value of the content based at least in part on the updated user data. The processing module 210 may update a trend value of a plurality of contents based at least in part on the user data associated with a plurality of contents. In other exemplary embodiments, the processing module 210 may update a trend value of a content based least in part on different time periods. For example, the processing module 210 may update a trend value of the content based at least in part on a different predetermined time periods.

The presentation module 206 may provide an interface between users associated with the trend rating system 102, users associated with the plurality of work stations 106(1-N), and the user associated with the plurality of content providers 108(1-N). The presentation module 206 may include a user interface, e.g., a graphical user interface, to receive one or more queries/requests from the user associated with the trend rating system 102 and to provide a trend value of a content to the user associated with the trend rating system 102. Also, the presentation module 206 may provide a trend value of a content to the users associated with the plurality of work stations 106(1-N). Further, the presentation module 206 may provide a trend value of a content to users associated with the plurality of content providers 108(1-N). The presentation module 206 may provide a separate or a unified graphical user interface. The presentation module 206 may include an Application Programming Interface (API) to interact with the plurality of work stations 106(1-N) or the plurality of content providers 108(1-N). In an exemplary embodiment, the presentation module 206 may present one or more graphical contents or displays to the user associated with the trend rating system 102, the user associated with the plurality of work stations 106(1-N), or the users associated with the plurality of content providers 108(1-N) of a trend value of a content.

In another exemplary embodiment, the presentation module 206 may receive one or more queries/requests from a plurality of content providers 108(1-N). In response to receiving the one or more queries/requests from a user associated with a content provider 108, the presentation module 206 may provide the one or more queries/requests to the input/output (I/O) module 208, the processing module 210, the database module 212, the work station list module 214, and the content list module 216. For example, the presentation module 206 may receive one or more queries/requests from the user associated with the work station 106 for a trend value of a content. In response to receiving the one or more queries/requests from the user associated with the content provider 108, the presentation module 206 may provide the one or more queries/requests to the input/output (I/O) module 208, the processing module 210, the database module 212, the work station list module 214, and/or the content list module 216 to provide a trend value of a content to the content provider 108.

In other exemplary embodiments, the presentation module 206 may receive one or more queries/requests from users associated with the plurality of work stations 106(1-N) to provide a trend value of a content. For example, a user may provide a request to the presentation module 206 to provide trend value of a content to the work station 106 associated with the user. In an exemplary embodiment, a user may provide one or more queries/requests to obtain a trend value of one of the plurality of contents based at least in part on the uniform resource identifiers (URIs) or uniform resource locators (URLs) associated with the content. In another exemplary embodiment, a user may provide a request to the presentation module 206 for an updated value of a content.

The database module 212 may store and manage user data and/or data identifier information associated with the user data. The database module 212 may provide an interface, e.g., a uniform interface, for other modules within the trend rating system 102 and may write, read, and search data stored in one or more repositories or databases. The database module 212 may also perform other functions, such as, but not limited to, concurrent access, backup and archive functions. Due to limited amount of storing space the database module 212 may compress, store, transfer or discard data stored within, after a period of time, e.g., a year. The database module 212 may provide user data associated with a content to the processing module 210. For example, the database module 212 may receive user data identifier information from the processing module 210 and provide user data associated with the user data identifier information to the processing module 210.

The database module 212 may be network accessible storage and may be local, remote, or a combination thereof to modules 206, 208, 210, 214, and/or 216. The database module 212 may utilize a redundant array of inexpensive disks (RAID), tape, disk, a storage area network (SAN), an internet small computer systems interface (iSCSI) SAN, a Fibre Channel SAN, a common Internet File System (CIFS), network attached storage (NAS), a network file system (NFS), or other computer accessible storage. In one or more embodiments, database module 212 may be a database, such as an Oracle® database, a Microsoft® SQL Server database, a DB2 database, a MySQL® database, a Sybase® database, an object oriented database, a hierarchical database, or other database. The database module 212 may utilize flat file structures for storage of data.

The work station list module 214 may provide a directory or list of the plurality of work stations 106(1-N). The work station list module 214 may store address information associated with the plurality of work stations 106(1-N). The work station list module 214 may format the address information of the plurality of work stations 106(1-N) into desired format. In an exemplary embodiment, the desired format for storing the address information associated with the plurality of work stations 106(1-N) may include tables, hash tables, search trees, matrix, spread sheets, models, array structure, linear representation, or other representations of the directory of address information of the plurality of work stations 106(1-N). For example, the work station list module 214 may include one or more databases to store a directory or list of address information associated with the plurality of work stations 106(1-N). In an exemplary embodiment, the processing module 210 may access the work station list module 214 to identify address information (e.g., uniform resource identifiers (URIs) or uniform resource locators (URLs), private electronic mail addresses, or other address information) associated with the work station 106.

The work station list module 214 may track user data received from the plurality of work stations 106(1-N). In an exemplary embodiment, the processing module 210 may access the work station list module 214 to obtain address information associated with a work station 106 to obtain user data associated with the work station 106. The processing module 210 may provide trend value of a content to the plurality of work stations 106(1-N) simultaneously. After completion of providing a trend value of a content to a first work station 106, the processing module 210 may access the work station list module 214 to obtain address information associated with a second work station 106. The processing module 210 may provide a trend value of a content requested by a user associated with the second work station 106 to the second work station 106. The processing module 210 may continue to obtain address information associated with the plurality of work stations 106(1-N) until all the work stations 106(1-N) receive the trend value of a content requested by each of the plurality of work stations 106(1-N).

The content list module 216 may include database to store one or more content identifier information of contents provided by the plurality of content providers 108(1-N) monitored by the trend rating system 102. The content list module 216 may also include database to store information associated with the plurality of content providers 108(1-N). In an exemplary embodiment, the content list module 216 may store address information (e.g., URL or URI) associated with the contents provided by the plurality of content providers 108(1-N) monitored by the trend rating system 102. The plurality of content providers 108(1-N) may access the content list module 216 to update the content identifier information associated with the contents monitored by the trend rating system 102. The content list module 216 may monitor various contents provided by the plurality of content providers 108(1-N). For example, the content list module 216 may track various contents provided by each of the plurality of content providers 108(1-N). The content list module 216 may provide content identifier information to the input/output (I/O) module 208 in order to receive user data associated with the content having the content identifier information. The content list module 216 may provide content identifier information to the database module 212 in order to store user data corresponding to the content identifier information.

In another exemplary embodiment, the processing module 210 may access the content list module 216 to search for content identifier information. For example, the processing module 210 may access the content list module 216 to verify whether a trend value requested corresponding to a content is monitored by the trend rating system 102. The processing module 210 may periodically access the content list module 216 to search for the content identifier information. The processing module 210 may verify whether the content identifier information provided by the trend value request matches the content identifier information stored in the content list module 216.

Figure 3:
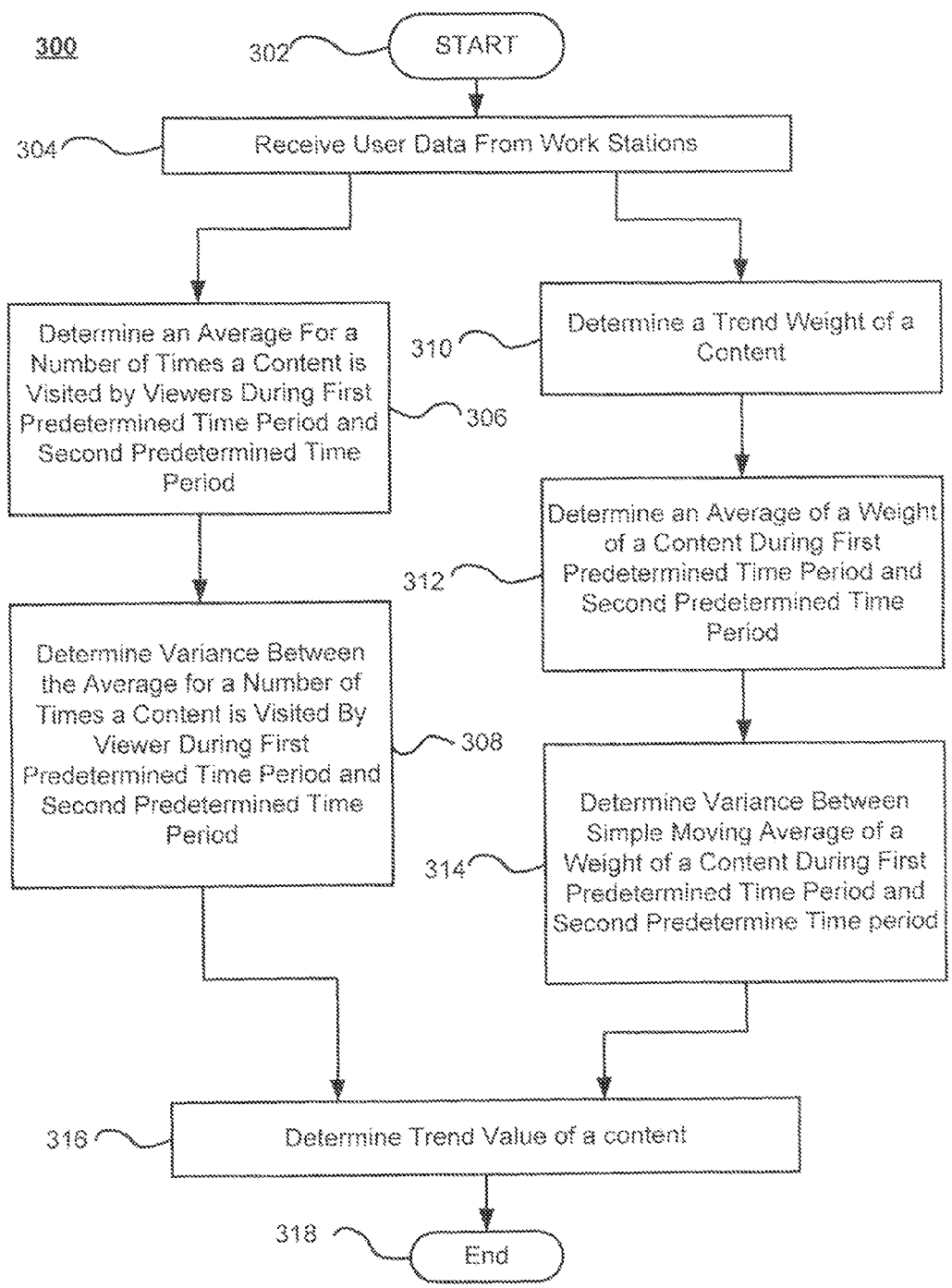
FIG. 3 is a flowchart illustrating the functionality for rating a content based at least in part on a trend value of the content according to a particular embodiment.

FIG. 3 is a flowchart illustrating the functionality for rating a content based at least in part on a trend value of the content according to a particular embodiment. This exemplary method 300 may be provided by way of example, as there are a variety of ways to carry out the method. The method 300 shown in FIG. 3 can be executed or otherwise performed by one or a combination of various systems. The method 300 is described below may be carried out by the system and network shown in FIGS. 1 and 2, by way of example, and various elements of the system and network are referenced in explaining the example method of FIG. 3. Each block shown in FIG. 3 represents one or more processes, methods or subroutines carried out in exemplary method 300. Referring to FIG. 3, exemplary method 300 may begin at block 302.

At block 302, the method 300 for rating a content based at least in part on a trend value of the content may begin.

At block 304, user data associated with a content may be provided to the trend rating system 102. For example, users associated with a plurality of work stations 106(1-N) may visit a content. The user data associated with a content may be acquired by the content provider 108 and provided to the trend rating system 102 via the input/output (I/O) module 208. In another exemplary embodiment, the user data associated with a content may be received by or acquired by the input/output (I/O) module 208 of the trend rating system 102. In an exemplary embodiment, the user data associated with a content may include a least one of a number of times users visits a content in a predetermine period of time, an amount of time a user views the content per each visit, and other data associated with users visiting a content. The input/output (I/O) module 208 may receive user data associated with a content for different predetermined periods of time. In an exemplary embodiment, the input/output (I/O) module 208 may receive user data associated with a content for a first predetermined period of time. The input/output (I/O) module 208 may receive user data associated with a content for a second predetermined period of time. The first predetermined period of time may be longer than the second predetermined period of time. In an exemplary embodiment, the first predetermined period of time may be 50 days and the second predetermined period of time may be 200 days. The input/output (I/O) module 208 may transfer the received user data to the database module 212 and stored.

The input/output (I/O) module 208 may receive new or updated user data. For example, the input/output (I/O) module 208 may periodically receive new or updated user data and transfer the new or updated user data to the database module 212 to be stored. In an exemplary embodiment, the input/output (I/O) module 208 may receive and store new or updated user data associated with a content every half hour. In another exemplary embodiment, the input/output (I/O) module 208 may receive and store new or updated user data every day. After receiving user data associated with a content, the method 300 may proceed to block 306.

At block 306, the trend based rating system 102 may determine an average for a number of times a content may be visited by viewers. In an exemplary embodiment, the processing module 210 may determine a simple moving average for a number of times a content may be visited by viewers. For example, the processing module 210 may access the database module 212 to obtain user data associated with a content for the first predetermined time period. The processing module 210 may determine a simple moving average for a number of times a content may be visited by viewers during the first predetermined time period based at least in part on the user data for the first predetermined time period. For example, the processing module may determine an average for a number of times a content may be visited by viewers using the following formula:

$$CPHC(ty-tn) = \frac{\sum_{tn}^{ty} CPHC(t)}{ty-tn} \quad \text{Formula (1)}$$

in Formula (1), CPHC(t) represents a number of times a content may be visited by viewers per a time period (t); ty represents a point in time; and tn represents a point in time after ty.

In an exemplary embodiment, the first predetermined time period may be 50 days (e.g., ty–tn) and t=N, N–1, N–2, . . . N–50 days. The average for a number of time a content may be visited by viewers during the first predetermined time period may be determined by cphc(50)=((cphc(N)+cphc(N–1)+cphc(N–2)+cphc(N–3) . . . cphc(N–50))/N.

The processing module 210 may also access the database module 212 to obtain user data associated with a content for the second predetermined time period. The processing module 210 may determine an average (e.g., a simple moving average) for a number of times a content may be visited by viewers during the second predetermined time period based at least in part on the user data for the second predetermined time period. For example, the processing module may determine an average for a number of times a content may be visited by viewers using the following formula:

$$CPHC(t^1y - t^1n) = \frac{\sum_{t^1n}^{t^1y} CPHC(t)}{t^1y - t^1n} \quad \text{Formula (2)}$$

in Formula (2), CPHC(t) represents a number of times a content may be visited by a viewer per time period (t); $t^1y$ represents a point in time; and $t^1n$ represents a point in time after $t^1y$.

In an exemplary embodiment, the second predetermined time period may be 200 days and t=N, N–1, N–2, . . . N–200 days. In an exemplary embodiment, the second predetermined time period may include the first predetermined time period. In another exemplary embodiment, the second predetermined time period may be disparate time period from the first predetermined time period. The average for a number of time a content may be visited by viewers during the second predetermined time period may be determined by cphc(200)= ((cphc(N)+cphc(N–1)+cphc(N–2)+cphc(N–3) . . . cphc(N–200))/N. After determining the average for a number of times a content is visited by viewers, the method 300 may proceed to block 308.

At block 308, the trend based rating system 102 may determine a variance of the average for a number of time a content may be visited by users between the first predetermined time period and the second predetermined time period. For example, the processing module 210 may determine a variance of the average for a number of times a content may be visited by users between the first predetermined time period and the second predetermined time period. In an exemplary embodiment, the processing module 210 may utilize an Euclidean algorithm to determine a variance of the average of a number of times a content may be visited by users between the first predetermined time period and the second predetermined time period. For example, the processing module 210 may determine a variance of the average for a number of times a content may be visited by users between the first predetermined time period and the second predetermined time period using the following formula:

$$\Delta CPHC = CPHC(ty-tn) - CPHC(t^1y - t^1n) \quad \text{Formula (3)}$$

in Formula (3), CPHC(ty–tn) represents a number of times a content may be visited by viewers per a time period (ty–tn); $CPHC(t^1y-t^1y)$ represents a number of times a content may be visited by viewers per a time period ($t^1y-t^1y$).

After determining a variance of the average for a number of time a content may be visited by users between the first predetermined time period and the second predetermined time period, the method 300 may proceed to block 310.

At block 310, the trend based rating system 102 may determine a trend weight of a content. For example, the trend weight of a content may be defined as the quotient of an amount of time a content is viewed by the users per visit divided by a number of times a content is visited by users. The processing module 210 may access the database module 212 to obtain user data to determine a trend weight of a content. The processing module 210 may determine a trend weight of a content during a time period (t) using the following formula:

$$Xw(t) = \frac{ubt(t)}{CPHC(t)} \quad \text{Formula (4)}$$

in Formula (4), CPHC(t) represents a number of times a content is visited by users during a time period (t); and ubt(t) represents an amount of time a content is viewed by the user per visit during a time period (t). After determining a trend weight of a content during a time period (t), the method 300 may proceed to block 312.

At block 312, the trend based rating system 102 may determine an average of a weight of a content. The trend based rating system 102 may determine a simple moving average of a weight of a content. For example, the weight of a content may be defined as an amount of time a content is viewed by the user per visit multiply by a trend weight of a content. The processing module 210 may determine a weight of a content using the following formula:

$$CPWD = Xw(t) * ubt(t) \quad \text{Formula (5)}$$

in Formula (5), Xw(t) represents a trend weight of a content during a time period (t); ubt(t) represents an amount of time a content is viewed by the user per visit during a time period (t).

The processing module 210 may access the database module 212 to obtain user data associated with the first predetermined time period. The processing module 210 may determine an average of a weight of a content for the first predetermined time period based at least in part on the user data of the first predetermined time period. The processing module 210 may determine an average of a weight of a content for the first predetermined time period using the following formula:

$$CPWD(ty-tn) = \sum_{tn}^{ty} \frac{(X_W(t)*ubt(t))}{ty-tn}$$ Formula (6)

in Formula (6), ty represents a point in time; and tn represents a point in time after ty.

In an exemplary embodiment, the first predetermined time period may be 50 days (ty–tn) and t=N. N–1, N–2, ... N–50 days. Each weight of a content may be determined by cpwd (t)=($X_w$(t)*ubt(t)). The average of a weight of a content during the first predetermined time period may be determined by cpwd(ty–tn)=((cpwd(N)+cpwd(N–1)+cpwd(N–2)+cpwd (N–3) ... cpwd(N–50))/N.

The processing module 210 may also access the database module 212 to obtain user data associated with a content for the second predetermined time period. The processing module 210 may determine an average of a weight of a content during the second predetermined time period based at least in part on the user data for the second predetermined time period. The processing module 210 may determine an average of a weight of a content for the first predetermined time period using the following formula:

$$CPWD(t^1y - t^1n) = \frac{\sum_{t^1n}^{t^1y}(X_w^j(t)*ubt(t))}{t^1y - t^1n}$$ Formula (7)

in Formula (7), $t^1y$ represents a point in time; and $t^1n$ represents a point in time after $t^1y$.

In an exemplary embodiment, the second predetermined time period may be 200 days and t=N, N–1, N–2, ... N–200 days. In an exemplary embodiment, the second predetermined time period may include the first predetermined time period. In another exemplary embodiment, the second predetermined time period may be disparate time period from the first predetermined time period. Each weight of a content may be determined by cpwd(t)=(ubt(t)*$x_w$(t)). The average of a weight of a content during the second predetermined time period may be determined by cpwd($t^1$y–$t^1$n)=((cpwd(N)+ cpwd(N–1)+cpwd(N–2)+cpwd(N–3) ... cpwd(N–200))/N. After determining the average of a weight of a content, the method 300 may proceed to block 314.

At block 314, the trend based rating system 102 may determine a variance of the average of a weight of a content between the first predetermined time period and the second predetermined time period. For example, the processing module 210 may determine a variance of the average of a weight of a content between the first predetermined time period and the second predetermined time period. In an exemplary embodiment, the processing module 210 may utilize an Euclidean algorithm to determine a variance of the average of a weight of a content between the first predetermined time period and the second predetermined time period. The processing module 210 may determine a variance of the average of a weight of a content between the first predetermined time period and the second predetermined time period using the following formula:

$$\Delta CPWD=CPWD(ty-tn)-CPWD(t^1y-t^1n)$$ Formula (8)

in Formula 8, CPWD(ty–tn) represents an average of a weight of a content for a time period (ty–tn); CPWD($t^1$y–$t^1$n) represents an average of a weight of a content for a time period ($t^1$y–$t^1$n).

After determining a variance of the average of a weight of a content between the first predetermined time period and the second predetermined time period, the method 300 may proceed to block 316.

At block 316, the trend based rating system 102 may determine a trend value of a content based at least in part on a variance of an average of a number of times a content may be visited by a user and a variance of an average of a weight of a content. For example, the processing module 210 may determine a trend value of a content by multiplying the variance of an average of a number of times the content may be visited by a user by the variance of an average of a weight of the content. In an exemplary embodiment, when the trend value of a content is low, the trend based rating system 102 may determine that the content is trending. In another exemplary embodiment, when the trend value is high, the trend based rating system 102 may determine that the content is not trending. After determining a trend value of a content, the method 300 may proceed to block 318.

At block 316, the method 300 for rating a content based at least in part on a trend of the content may end. The method 300 may be repeated for various contents provided by the plurality of content providers 108(1-N).

FIG. 4 is a table of user data for rating a content based at least in part on a trend value of the content according to a particular embodiment. As illustrated in FIG. 4, table 400 may include users data associated with a predetermined time period. The user data may include a number of times a content may be visited by a user for a time period. The user data may also include an amount of time a content is viewed by the users per visit. In an exemplary embodiment, table 400 may include user data associated with a period of 20 days. The table 400 may include a number of times a content may be visited by a user for each day of the 20 day period. The table 400 may also include an amount of time a content is viewed by the users per visit for each day of the 20 day period.

As discussed above, the trend weight of a content may be determined by an amount of time a user may view the content per visit divided by a number of times a content may be visited by users per day. The table 400 may include the trend weight of a content for each day of the 20 day period. Also, a weight of a content may be determined by multiplying an amount of time a content is viewed by the user per visit by a trend weight of a content. The table 400 may include a weight of a content for each day of the 20 day period. The average of a weight of a content may be determined for a first predetermined time period and a second predetermined time period. In an exemplary embodiment, the first predetermined time period may be from day 12 to day 20 of the 20 day period and the second predetermined time period may be from day 1 to day of the 20 day period. The average weight of a content associated with the first predetermined time period may be approximately 0.008188 and the average weight of a content associated with the second predetermined time period may be approximately 0.84772. The variance of the average of a weight of a content between the first predetermined time period and the second predetermined time period may be approximately –0.83953.

The average of a number of times a content is visited by users may be determined for a first predetermined time period and a second predetermined time period. In an exemplary embodiment, the first predetermined time period may be from day 12 to day 20 of the 20 day period and the second predetermined time period may be from day 1 to day 20 of the 20 day period. The average number of times a content is visited by user associated with the first predetermined time period may be approximately 2904 and the average weight of a content associated with the second predetermined time period may be approximately 1778.05. The variance of the average of a number of times a content is visited by users between the first predetermined time period and the second predetermined time period may be approximately 1125.95. The trend value associated with a content may be equal to approximately −945.27. Thus, the trend rating system 102 may determine that the content may be downward trending because an amount of time a content is viewed by the users per visit decreased even though a number of times a content is visited by users increased.

FIG. 5 is another table of user data for rating a content based at least in part on a trend value of the content according to a particular embodiment. As illustrated in FIG. 5, table 500 may include users data associated with a predetermined time period. The user data may include a number of times a content may be visited by a user for a time period. The user data may also include an amount of time a content is viewed by the users per visit. In an exemplary embodiment, table 500 may include user data associated with a period of 20 days. The table 500 may include a number of times a content may be visited by a user for each clay of the 20 day period. The table 500 may also include an amount of time a content is viewed by the users per visit for each day of the 20 clay period. Change accordingly.

As discussed above, the trend weight of a content may be determined by an amount of time a user may view the content per visit divided by a number of times a content may be visited by users per day. The table 500 may include the trend weight of a content for each day of the 20 day period. Also, a weight of a content may be determined by multiplying an amount of time a content is viewed by the user per visit by a trend weight of a content. The table 500 may include a weight of a content for each day of the 20 day period. The average of a weight of a content may be determined for a first predetermined time period and a second predetermined time period. In an exemplary embodiment, the first predetermined time period may be from day 12 to day 20 of the 20 day period and the second predetermined time period may be from day 1 to day 20 of the 20 day period. The average weight of a content associated with the first predetermined time period may be approximately 0.258 and the average weight of a content associated with the second predetermined time period may be approximately 0.1979. The variance of the average of a weight of a content between the first predetermined time period and the second predetermined time period may be approximately 0.06.

The average of a number of times a content is visited by users may be determined for a first predetermined time period and a second predetermined time period. In an exemplary embodiment, the first predetermined time period may be from day 12 to day 20 of the 20 day period and the second predetermined time period may be from day 1 to day 20 of the 20 day period. The average number of times a content is visited by user associated with the first predetermined time period may be approximately 2888.88 and the average weight of a content associated with the second predetermined time period may be approximately 1750. The variance of the average of a number of times a content is visited by users between the first predetermined time period and the second predetermined time period may be approximately 1138.88. The trend value associated with a content may be equal to approximately 68.47. Thus, the trend rating system 102 may determine that the content may be neutrally trending because an amount of time a content is viewed by the users per visit increased and subsequently decreased.

FIG. 6 is another table of user data for rating a content based at least in part on a trend value of the content according to a particular embodiment. As illustrated in FIG. 6, table 600 may include users data associated with a predetermined time period. The user data may include a number of times a content may be visited by a user for a time period. The user data may also include an amount of time a content is viewed by the users per visit. In an exemplary embodiment, table 600 may include user data associated with a period of 20 days. The table 600 may include a number of times a content may be visited by a user for each day of the 20 day period. The table 600 may also include an amount of time a content is viewed by the users per visit for each day of the 20 day period.

As discussed above, the trend weight of a content may be determined by an amount of time a user may view the content per visit divided by a number of times a content may be visited by users per day. The table 600 may include the trend weight of a content for each day of the 20 day period. Also, a weight of a content may be determined by multiplying an amount of time a content is viewed by the user per visit by a trend weight of a content. The table 600 may include a weight of a content for each day of the 20 clay period. The average of a weight of a content may be determined for a first predetermined time period and a second predetermined time period. In an exemplary embodiment, the first predetermined time period may be from day 12 to day 20 of the 20 clay period and the second predetermined time period may be from day 1 to day 20 of the 20 day period. The average weight of a content associated with the first predetermined time period may be approximately 0.00799 and the average weight of a content associated with the second predetermined time period may be approximately 0.01149. The variance of the average of a weight of a content between the first predetermined time period and the second predetermined time period may be approximately −0.0035.

The average of a number of times a content is visited by users may be determined for a first predetermined time period and a second predetermined time period. In an exemplary embodiment, the first predetermined time period may be from day 12 to day 20 of the 20 day period and the second predetermined time period may be from day 1 to day 20 of the 20 day period. The average number of times a content is visited by user associated with the first predetermined time period may be approximately 143828026 and the average weight of a content associated with the second predetermined time period may be approximately 65021911. The variance of the average of a number of times a content is visited by users between the first predetermined time period and the second predetermined time period may be approximately 78806114. The trend value associated with a content may be equal to approximately −275806. Thus, the trend rating system 102 may determine that the content may be upward trending because a number of times a content is visited by users is increased.

FIG. 7 is another table of user data for rating a content based at least in part on a trend value of the content according to a particular embodiment. As illustrated in FIG. 7, table 700 may include users data associated with a predetermined time period. The user data may include a number of times a content may be visited by a user for a time period. The user data may also include an amount of time a content is viewed by the users per visit. In an exemplary embodiment, table 700 may include user data associated with a period of 20 days. The table 700 may include a number of times a content may be visited by a user for each day of the 20 clay period. The table 700 may also include an amount of time a content is viewed by the users per visit for each day of the 20 day period.

As discussed above, the trend weight of a content may be determined by an amount of time a user may view the content per visit divided by a number of times a content may be visited by users per day. The table 700 may include the trend weight of a content for each day of the 20 day period. Also, a weight of a content may be determined by multiplying an amount of time a content is viewed by the user per visit by a trend weight of a content. The table 700 may include a weight of a content for each day of the 20 day period. The average of a weight of a content may be determined for a first predetermined time period and a second predetermined time period. In an exemplary embodiment, the first predetermined time period may be from day 12 to day 20 of the 20 day period and the second predetermined time period may be from day 1 to day of the 20 day period. The average weight of a content associated with the first predetermined time period may be approximately 1.623 and the average weight of a content associated with the second predetermined time period may be approximately 1.344. The variance of the average of a weight of a content between the first predetermined time period and the second predetermined time period may be approximately 0.279.

The average of a number of times a content is visited by users may be determined for a first predetermined time period and a second predetermined time period. In an exemplary embodiment, the first predetermined time period may be from day 12 to day 20 of the 20 day period and the second predetermined time period may be from day 1 to day 20 of the 20 day period. The average number of times a content is visited by user associated with the first predetermined time period may be approximately 2889 and the average weight of a content associated with the second predetermined time period may be approximately 1750. The variance of the average of a number of times a content is visited by users between the first predetermined time period and the second predetermined time period may be approximately 1139. The trend value associated with a content may be equal to approximately 31.7. Thus, the trend rating system 102 may determine that the content may be upward trending because an amount of time a content is viewed by the users per visit and a number of times a content is visited by users increased.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising:
    receiving, via an input/output module, a number of times at least one content is viewed and an amount of time the at least one content is viewed for a first predetermined time period and a number of times the at least one content is viewed and an amount of time the at least one content is viewed for a second predetermined time period;
    determining, via a processing module having a processor, a first average of the number of times the at least one content is viewed for the first predetermined time period and a second average of the number of times the at least one content is viewed for the second predetermined time period;
    determining, via the processing module having the processor, a first variance between the first average; and the second average;
    determining, via the processing module, a first weight of the at least one content for the first predetermined time period and a second weight of the at least one content for the second predetermined time period, wherein the first weight and the second weight are based on at least the number of times the at least one content is viewed and the amount of time the at least one content is viewed;
    determining, via the processing module, a second variance between the first weight and the second weight;
    determining, via the processing module having the processor, a trend value of the one or more contents based at least in part on the first variance and the second variance; and
    outputting, via a presentation module, the trend value.

2. The method according to claim 1, wherein the first weight is based on a first trend weight calculated by dividing the amount of time the at least one content is viewed during the first predetermined time by the number of times the at least one content is viewed during the first predetermined time and wherein the second weight is based on a second trend weight calculated by dividing the amount of time the at least one content is viewed during the second predetermined time by the number of times the at least one content is viewed during the second predetermined time.

3. The method according to claim 2, wherein determining the first weight further comprises multiplying the first trend weight by the amount of time the at least one content is viewed during the first predetermined time period and wherein determining the second weight further comprises multiplying the second trend weight by the amount of time the at least one content is viewed during the second predetermined time period.

4. The method according to claim 3, further comprising:
    determining a first average of the first weight for the first predetermined time period; and
    determining a second average of the second weight for the second predetermined time period.

5. The method according to claim 4, wherein determining the second variance comprises determining a variance between the first average of the first weight for the first predetermined time period and the second average of the second weight for the second predetermined time period.

6. The method according to claim 5, wherein determining the trend value of the one or more contents comprises multiplying the first variance by the second variance.

7. The method according to claim 1, wherein the second predetermined time period includes the first predetermined time period.

8. A non-transitory computer readable medium storing an executable program comprising instructions to perform the method of claim 1.

9. A system, comprising:
    at least one server, the at least one server comprising:
        an input/output module configured to receive a number of times at least one content is viewed and an amount of time the at least one content is viewed for a first predetermined time period and a number of times the at least one content is viewed and an amount of time the at least one content is viewed for a second predetermined time period;

a processing module having at least one processor configured to determine:
- a first average of the number of times the at least one content is viewed for the first predetermined time period and a second average of the number of times the at least one content is viewed for the second predetermined time period;
- a first variance between the first average and the second average;
- a first weight of the at least one content for the first predetermined time period and a second weight of the at least one content for the second predetermined time period wherein the first weight and the second weight are based on at least the number of times the at least one content is viewed and the amount of time the at least one content is viewed;
- a second variance between the first weight and the second weight; and
- a trend value of the one or more contents based at least in part on the first variance and the second variance; and a presentation module having a graphical interface configured to provide the trend value.

10. The system according to claim 9, further comprising a database module configured to store the number of times at least one content is viewed and the amount of time the at least one content is viewed for the first predetermined time period and the number of times at least one content is viewed and the amount of time the at least one content is viewed for the second predetermined time period.

11. The system according to claim 9, further comprising a work station list module configured to store information associated with a plurality of work stations.

12. The system according to claim 11, wherein the work stations list module is further configured to track user data received from the plurality of work stations.

13. The system of claim 12, wherein the work station list module is further configured to obtain user data associated with each of the plurality of work stations.

14. The system of claim 11, wherein the work station list module is further configured to obtain work station address data from each of the plurality of work stations.

15. The system of claim 14, wherein the work station list module is further configured to send to at least one of the plurality of work stations the trend value of a content requested by the at least one of the plurality of work stations.

16. The system according to claim 9, further comprising a content list module configured to store information associated with the at least one content.

17. The system according to claims 16, wherein the content list module is further configured to verify whether a trend value corresponding to a content is monitored by the system.

18. The system according to claim 16, wherein the content list module is further configured to track a plurality of contents provided by a plurality of content providers.

19. The system of claim 9, wherein the first weight is based on a first trend weight calculated by dividing the amount of time the at least one content is viewed during the first predetermined time by the number of times the at least one content is viewed during the first predetermined time and wherein the second weight is based on a second trend weight calculated by dividing the amount of time the at least one content is viewed during the second predetermined time by the number of times the at least one content is viewed during the second predetermined time.

20. The system of claim 19, wherein determining the first weight further comprises multiplying the first trend weight by the amount of time the at least one content is viewed during the first predetermined time period and wherein determining the second weight further comprises multiplying the second trend weight by the amount of time the at least one content is viewed during the second predetermined time period.

21. The system of claim 20, wherein determining the trend value of the one or more contents comprises multiplying the first variance by the second variance.

* * * * *